(12) United States Patent
Massonneau et al.

(10) Patent No.: US 9,715,274 B2
(45) Date of Patent: Jul. 25, 2017

(54) METHOD FOR DETERMINING THE DIRECTION IN WHICH A USER IS LOOKING

(71) Applicant: SURICOG, Paris (FR)

(72) Inventors: Marc Massonneau, Tillieres sur Avre (FR); Marc Swynghedauw, Paris (FR)

(73) Assignee: SURICOG, Paris (FR)

( * ) Notice: Subject to any disclaimer, the term of this patent is extended or adjusted under 35 U.S.C. 154(b) by 31 days.

(21) Appl. No.: 14/391,579

(22) PCT Filed: Apr. 12, 2013

(86) PCT No.: PCT/IB2013/052930
§ 371 (c)(1),
(2) Date: Oct. 9, 2014

(87) PCT Pub. No.: WO2013/153538
PCT Pub. Date: Oct. 17, 2013

(65) Prior Publication Data
US 2015/0042558 A1 Feb. 12, 2015

(30) Foreign Application Priority Data

Apr. 12, 2012 (FR) ..................... 12 53395

(51) Int. Cl.
*G09G 5/00* (2006.01)
*G06F 3/01* (2006.01)
(Continued)

(52) U.S. Cl.
CPC .............. *G06F 3/013* (2013.01); *G06F 3/005* (2013.01); *G06F 3/012* (2013.01); *G06F 3/0425* (2013.01)

(58) Field of Classification Search
None
See application file for complete search history.

(56) References Cited

U.S. PATENT DOCUMENTS 6,113,237 A    9/2000   Ober et al.
6,152,563 A * 11/2000   Hutchinson ............ A61B 3/113
                                                 351/209
(Continued)

FOREIGN PATENT DOCUMENTS

AU     2012201615 A1   4/2012
EP      1 403 680 A1   3/2004
(Continued)

OTHER PUBLICATIONS

Bharath et al., "Tracking Method for Human Computer Interaction using Wii Remote," *Emerging Trends in Robotics and Communications Technologies*, 2010, pp. 133-137.
(Continued)

*Primary Examiner* — Christopher R Lamb
(74) *Attorney, Agent, or Firm* — Cooper Legal Group, LLC

(57) ABSTRACT

The present invention relates to a method for determining the direction in which a user is looking, which includes acquiring images of the eye, in particular by means of an optical sensor, the method including: a) a first processing of the images, yielding information on the orientation of the eye according to the observation of an area of the eye in which the aspect varies with the rotation of the eye; and b) a second processing of the images, yielding information on the kinematics of the eye by comparing at least two consecutive images; method in which information is generated relating to the direction in which the user is looking relative to the head of the user, at least according to the information supplied by the first and second processes.

10 Claims, 3 Drawing Sheets

(51) Int. Cl.
*G06F 3/00* (2006.01)
*G06F 3/042* (2006.01)

(56) References Cited

U.S. PATENT DOCUMENTS

| | | | |
|---|---|---|---|
| 2005/0110950 A1 | 5/2005 | Thorpe et al. | |
| 2008/0049185 A1* | 2/2008 | Huffman | A61B 3/113 351/206 |
| 2010/0007582 A1 | 1/2010 | Zalewski | |
| 2010/0045933 A1 | 2/2010 | Eberl et al. | |
| 2010/0283972 A1 | 11/2010 | Plant et al. | |
| 2012/0019645 A1 | 1/2012 | Maltz | |
| 2014/0334666 A1* | 11/2014 | Lankford | G06F 3/013 382/103 |

FOREIGN PATENT DOCUMENTS

| | | |
|---|---|---|
| EP | 2 261 772 A1 | 12/2010 |
| WO | WO 2010/045933 A1 | 4/2010 |

OTHER PUBLICATIONS

Alter, "3D Pose from 3 Corresponding Points under Weak-Perspective Projection," *Massachusetts Institute of Technology*, 1992, pp. 1-39.

Horn et al., "Determining Optical Flow," *Artificial Intelligence*, 1981, pp. 185-203.

Hutter et al., "Matching 2-D Ellipses to 3-D Circles with Application to Vehicle Pose Identification," *Image and Vision Computing New Zealand*, 2009, pp. 1-16.

French Search Report and Written Opinion issued in French Application No. FR1253395 issued Dec. 12, 2012 (with translation).

International Search Report issued in International Application No. PCT/IB2013/052930 mailed Jul. 12, 2013.

Written Opinion of the International Searching Authority issued in International Application No. PCT/IB2013/052930 mailed Jul. 12, 2013 (with translation).

* cited by examiner

METHOD FOR DETERMINING THE DIRECTION IN WHICH A USER IS LOOKING

The present invention relates to the determination of the direction of a person's gaze by tracking their ocular movements, in particular when this person is viewing a screen of a computing system.

U.S. Pat. No. 6,113,237 pertains to a device making it possible to detect the horizontal and vertical movements of a person's eyes. It gives the position of the pupil, but not the direction of the gaze. It does not make it possible to obtain high precision.

Patent applications US 2005/0110950 and US 2010/0283972 pertain to medical applications of the detection of the saccadic movements of the eye and do not teach more particularly to determine the direction of the gaze.

In international application WO 2010/083853, an image of the scene observed by the user is acquired so as to determine the latter's observation point.

Application US 2010/045933 proposes a scheme for identifying the direction of the gaze involving a reflection on the retina which requires a complex optical rig (mobile mirrors scanning the zone measured on the basis of a pointlike luminous source of very small size) associated with a scheme for off-line processing of the information based on fixed frames of reference. This device does not use the synergistic and auto-sustained aspects of a real-time dual source of information with relative referencing and may not therefore respond in a satisfactory manner to the problematic issues of instantaneous processing of information and of auto-correction of drift.

Application EP 2 261 772 describes a scheme for reconstructing the direction of gaze on the basis of a stationary, remote camera facing the user. A first processing identifies and then tracks by optical flow the position and the orientation of the head and a second processing identifies one or both of the user's irises. This fixed device, which is not embedded on board, appreciably restricts the user's mobility and does not meet the expected precision constraints of such a system.

Application US 2012/019645 describes a device making it possible to determine the gaze data on an onboard viewing screen. It does not include any referencing to the outside world.

Existing systems may require relatively lengthy and constraining calibration. Moreover, drift is liable to occur, which limits in the duration the precision obtained and therefore the possibility of making enduring use of the results obtained.

A need exists to improve the productivity and the precision of the interface between man and a computing system, and in particular to simplify the calibration process.

A need further exists to accelerate the processing of the data and to render the system for determining the direction of the gaze more reactive and easily usable in real time.

Finally, a need exists to have a method allowing the user to benefit from a certain freedom of movement, at least of the head.

The invention is aimed at meeting all or part of these needs.

Method

The subject of the invention is thus, according to a first of its aspects, a method for determining the direction of the gaze of a user comprising the acquisition of images of the eye, in particular with the aid of an optical sensor, preferably a camera, the method comprising:

a) a first processing of these images which provides an item of information about the orientation of the eye, on the basis of the observation of a zone of the eye whose aspect varies with the rotation of the eye, and b) a second processing of these images which provides an item of information about the kinematics of the eye by comparing at least two successive images, in which method an item of information relating to the direction of the gaze in relation to the user's head is generated, in particular in the frame of reference of the user's head on the basis at least of the items of information delivered by the first and second processings.

By virtue of the aggregate of these processings, the precision is improved; this makes it possible to decrease the resolution of the camera used to acquire the images and therefore to increase the processing speed and to simplify the processing; this makes it possible to reduce the electrical consumption or to lighten the system or to render the system wireless and to increase its energy self-sufficiency.

Furthermore, the better precision makes it possible to reduce the drift over time with respect to the initial calibration and thus to prolong the duration of use without needing a new calibration. Comfort of use is thereby enhanced.

The first and second processings do not necessarily take place in the order a) then b) and may also take place in the order b) then a), the processings being carried out according to a loop making it possible to provide at regular time intervals an item of information relating to the direction of the gaze.

The image acquisition scheme used in the method may advantageously be non-intrusive of the eye. Stated otherwise, the images serve to determine the position and/or the displacement of the eye are images of the exterior of the eye and not images of a deep surface of the eye, such as the retina or the macula, or involving refractions and/or reflections on elements of the eye, such as the retina or the cornea. Thus, the images usable in the invention are eye surface aspect images, such as a portion at least of the contour of the iris and/or of the sclera. This may make it possible to preserve a relatively simple acquisition optic which is easy to integrate into spectacles for example. This may also make it possible to simplify the lighting integrated into the device worn by the user, since it is not necessary to cause a light ray to penetrate within the eye under particular conditions of incidence.

Diffuse lighting of the surface of the eye, in particular of the iris and of the sclera, may be suitable.

The invention does not rely on the observation of the reflection of luminous sources on the eye and may thus be more independent of the luminous environment. The images acquired may represent external kinematic and/or anatomical data of the eye.

The first and second processings may rely on the acquisition of images at different acquisition frequencies, and preferably the first processing is performed at a first acquisition frequency smaller than the second processing which is performed at a second frequency, with preferably furthermore a factor of at least 10 between the first and second frequencies.

The first and second processings may rely on the acquisition of images at different resolutions, and preferably the first processing relies on the acquisition of images at a greater resolution than the resolution of the acquisition performed during the second processing, for example greater by a factor of 5 at least.

The item of information delivered by the first processing may make it possible to correct the drifts related to the second processing, within the precision of the measurement.

First Processing

The first processing provides an item of information about the orientation of the eye, on the basis of the observation of a zone of the eye whose aspect varies with the rotation of the eye. The orientation is determined in a static manner independently of its evolution over time.

This first processing may be performed on the basis of a single image. It may be performed for each image.

This first processing may comprise the determination of the parameters related to the shape of the ellipse corresponding to the pupil, in particular so as to determine the position of a point of the eye, for example of the center of the pupil. It is possible to use an algorithm for reconstructing the shape of the pupil in the image by determining, by processing the image, the parameters of the ellipse corresponding to the circle of the pupil observed in a direction making an angle with the normal to the plane of this circle. It is possible to deduce the orientation of the eye by analyzing the evolution of the shape of this ellipse.

Such an algorithm is known from the article "*Matching 2-D ellipses to 3-D circles with application to vehicle pose identification*" by M. Hutter et al. *Image and Vision Computing New Zealand,* 2009. IVCN '09.

The reconstruction of an ellipse is for example possible on the basis of five points of its contour.

The disk of the pupil, projected onto a plane, is an ellipse which may be parametrized in the general form: $a.x^2 + b.x.y + c.y^2 + d.x + e.y + f = 0$, with $b^2 - 4.a.c < 0$. A limited number of points of the contour, in particular five, suffice to calculate the descriptive parameters of this ellipse (center, minor axis, major axis and angle of rotation). Knowing these characteristics and those of the camera, it is thus possible to reconstruct in 3D the direction of the vector normal to the disk whose projection is the ellipse.

The reconstruction of the ellipse may require a minimum resolution in order to obtain the necessary precision. In the case where the resolution of the image is low, use is made of an algorithm for reconstructing the ellipse making it possible to take account in the whole of the image of the intensity of the gray levels, rather than being concentrated on the contour of the spot corresponding to the pupil to retrace the ellipse there. One thereafter seeks to match a continuous function of given form with the corresponding gray levels. A better resolution than the resolution of the image is thus obtained depending on the size and the number of pixels therein. It is thus possible to use a relatively low resolution while retaining sufficient precision.

The direction of the eye in the frame of reference of the camera is given by the normal to the disk of the pupil taken at its center. This normal and also the center of the disk, which is different from the center of the ellipse, are obtained on the basis of the characteristics of the ellipse. The direction of the gaze in the frame of reference of the head is obtained by applying a fixed and known 3-axis rotation matrix.

The processed image does not necessarily comprise a view of the iris of the eye in its entirety. The invention makes it possible to obtain the ellipse even when the image comprises only a portion of the iris of the eye, either because the eye was partially closed during the capture of the image, or because the image is captured on the eye with a significant magnification. The processing may make it possible to obtain the desired item of information, even if only a partial view of the boundary of the iris, or indeed only of a boundary of the latter with the white of the eye, is available.

In contradistinction to the conventional schemes which calculate the orientation of the eye as a nonlinear function of the distance between the center of the ellipse and the center of one of the reflections on the cornea of an external lighting, called Purkinje points), this scheme makes it possible to ascertain the orientation of the eye without calling upon an external frame of reference such as the Purkinje points. The linearity of this solution makes it possible to dispense with the calibration schemes inherent in the conventional scheme.

Second Processing

The second processing provides an item of information about the kinematics of the eye by comparing at least two successive images, that is to say an item of information relating to the evolution of the position of the eye in its orbit between two instants.

This second processing may be performed on the basis of two consecutive images. It may be performed for each pair of successive images acquired by the optical sensor.

The second processing makes it possible to obtain items of information about the displacement of the eye in its orbit, and in particular an item of information about the angle of rotation of the eye, by making the assumption that the eye is a sphere.

The second processing comprises the determination of the optical flow between two successive images of the eye, that is to say the apparent movement caused by the relative movement between the optical sensor which acquires images and the eye. A corresponding algorithm is known from the article "*Determining Optical Flow*" by Berthold K. P. Horn et al, *Artificial Intelligence,* vol. 17, pp. 185-203, 1981.

The variation of the flow of pixels in an image is measured, by differencing between two or more images. Two successive images may be very close together in time. Two successive images are preferably of constant intensity. It is possible to chart between two images of one and the same zone of a mobile part of the eye comprising contrasts, for example two successive images of the sclera comprising blood vessels, or any region including all or part of the iris or of the pupil, the choice of the region not being limiting, the variation of the location of characteristic zones through their shapes or intensity.

The variation of location of the characteristic zones is observed through the variation of the flow of intensity of pixels in the plane parallel to the plane of the sensor. Measurement of this variation of the optical flow of pixels does not make it necessary to have to explicitly identify a reference image or reference patterns or characteristics in the image. In particular these "images" may be captured at very high frequencies by a second sensor independent of the first processing. It is not necessary for this second sensor to exhibit good resolution or good focusing provided that the measured zone be contrasted. Measurement of this variation of the optical flow is facilitated if the intensity of each image is constant.

Combination

The items of information resulting from the two processings may be combined to generate the item of information relating to the direction of the gaze, which may be an item of information relating to the direction of an eye. The item of information relating to the direction of the gaze may result from the addition of the two items of information, each being weighted as a function of a law which may depend on the two items of information themselves. The first processing makes it possible to obtain an item of information relating to a change of orientation of the direction of the gaze, in the frame of reference of the camera, through the measurement of the normal to the pupil. The second processing makes it possible to ascertain the differential in movement of one or more points of the sphere modeling the eye in the plane of the camera. These two items of information stem from two independent processings. They are combined and weighted to obtain a final eye direction measurement. This weighting is dependent on the consistency of the movement at this instant. Under the assumption of a pure three-dimensional rotational movement in relation to two axes and of unknown center and radius, from an initial angular position corresponding to the image at an instant t, the solution for the rotation making it possible to obtain the final state at the instant t+dt, which may be the following image, according to the two items of information obtained, is optimized. The solution retained is a weighting of the two results as a function of their consistency with the rotation model imposed. The two processings may be performed simultaneously or quasi-simultaneously. This may make it possible to profit from their functional and/or topographical complementarity so as to accelerate or facilitate the processings or improve their quality. One of the items of information may make it possible to correct the other or to help to determine it. It is for example possible to proceed by interpolation to determine one of the items of information.

It is for example possible by virtue of these items of information to circumvent the corneal refraction which may produce non-linearities stemming from the refraction of the pupil on the cornea, this refraction being due to the position of the optical sensor. The second processing makes it possible to obtain the items of information about the displacement of the eye in its orbit with a smaller influence of the refraction, insofar as the eye zone used is preferably situated relatively in the corner of the eye, for example on the sclera.

The second processing may produce errors in the case where the eye rotates too quickly in relation to the speed of capture of the optical sensors, hence the benefit of using temporally close successive images, therefore an optical sensor with high acquisition frequency, and of combining with the first processing.

It is for example possible to perform a modeling of the location of the center of rotation by considering that all of the already determined directions of the gaze pass through the center of the eye. Thus, it is possible to facilitate the determination of the subsequent directions of the gaze, by presupposing that they must also pass through the modeled center of rotation. Through the first processing, the position of the center of the pupil and the normal to the latter are known at each instant. On the basis of several successive measurements, the center of rotation of the pupil in space is the solution which minimizes, for example by the least squares scheme, the equation of a sphere knowing the positions in the plane of the camera of several points of this sphere as well as the normal to the sphere at each of these points.

The synergy of these two processings makes it possible to optimize the advantages of each in their inherent regimes.

The first processing makes it possible to precisely ascertain the position of the pupil when the movement of the eye is slow or zero compared with the acquisition frequency, angular speed corresponding to a movement frequency of about 30 Hz for example. If the displacement is very fast, in particular with an angular speed corresponding to a frequency of greater than or equal to 200 Hz, the image is distorted, appears fuzzy, scrambled and the reconstruction bad.

The second processing measures a rotation speed. The angular orientation is obtained by integration of this speed over time. The acquisition system being much faster than the movement of the eye, this scheme allows precise measurement during the very fast movements of the eye. Conversely, it is less beneficial during slow movements of the eye since the background noise of the image becomes significant in regard to the small displacement.

The combining of the two processings is therefore particularly advantageous and makes it possible to obtain at one and the same time good spatial precision and good temporal precision of the orientation of the eye by allowing a reciprocal autocorrection of the two processings.

Device

It is advantageously possible to use for the acquisition of the images a device worn by the user, comprising at least one first camera configured to acquire an image of all or part of an eye of the user.

The device may also comprise an electronic circuit making it possible to process the images acquired according to the method according to the invention, so as to determine a relative displacement of the eye with respect to the camera and the evolution of the direction of gaze over time.

This device may be worn in all or part by the user.

The device may furthermore comprise at least one information representation system in particular of the type such as a screen or semi-transparent screen, projector, loudspeaker or earpiece, force feedback vibratory system. The representation system may thus represent for example in a visual, graphical, audible or other manner an item of information obtained in step a) or b) or deriving from such an item of information.

The device may furthermore comprise at least one sensor of an item of physiological information relating to the wearer of the device. The latter sensor is for example chosen from among a microphone, a motion or acceleration sensor, an image sensor, one or more electrodes, a perspiration sensor.

The processing may take place in a manner entirely integrated into spectacles worn by the user, for example, or in an offloaded manner, by virtue of remote transmission of the images for example, or else in a mixed manner, in part at the level of the spectacles and in part in an offloaded manner, a preprocessing being for example performed by virtue of an electrical circuit carried by the spectacles and an item of information dispatched to a remote circuit through a non-wire link. The preprocessing makes it possible to reduce the bitrate of data transferred.

For the acquisition of the images, the eye or both eyes preferably is or are illuminated with infrared lighting, in particular with one or more LEDs. The luminous source or sources are for example of relatively wide angular aperture, in particular greater than 60°, so as to cover a large zone of the eye. The lighting source or sources may be disposed on the sides, in particular the exterior sides, this advantageously makes it possible to minimize the reflections observed by the camera.

The device may comprise just a single optical sensor to acquire an image of the user's eye. In the case where the device comprises just a single optical sensor and is devoid of a second optical sensor, the first and only optical sensor may by itself make it possible to obtain the images necessary for the two processings.

The successive images taken by the optical sensor or sensors may be images of the corner of the eye and/or of the pupil and/or of the sclera.

The device may comprise at least one second optical sensor configured to acquire an image of all or part of the eye.

The first and second optical sensors may allow the acquisition of images of one and the same eye of the user. The use of two sensors for an eye allows less dependence on possible significant variations of the direction of gaze.

The first and second optical sensors are each directed toward a different part of one and the same eye of the user, for example the pupil and the sclera.

The acquisition and processing chain associated with one eye may be duplicated for the other eye. Thus, the device may comprise at least one third optical sensor worn by the user and configured to acquire an image of all or part of the user's second eye. The device may comprise a fourth optical sensor worn by the user and configured to acquire an image of all or part of user's second eye. The third and the fourth optical sensor are each directed toward a different part of the user's second eye, for example the pupil and the sclera. Thus, it is possible to undertake simultaneous observation of the two eyes, thereby making it possible to further improve the precision.

It is furthermore possible to detect the frequency of closing of the eyelid of the eye studied or of the eyes studied. It is possible to use an electromyogram and/or an electrooculogram. The closing of one or both eyelids may be used to indicate that the user validates the positioning of the mouse at the targeted point of the screen, stated otherwise that he clicks with his eyes on the screen. The user may for example have to close his eyes fairly tightly to indicate that he desires to validate a choice of position.

Sensors

The sensor or sensors, in particular the second and/or fourth sensors, may be sufficiently fast digital sensors, for example operating at a frequency of at least 200 Hz, or indeed of at least 500 Hz, or indeed of at least 1000 Hz, for example at a frequency of about 1500 Hz, or indeed a frequency of at least 2000 Hz.

The sensor or sensors, in particular the second and/or fourth sensors, may have a relatively low resolution, for example of less than 500*500 pixels, or indeed of less than 200*200 pixels, for example lying between 16*16 and 100*100 pixels.

A captured image may for example have a resolution of the order of 100*100 pixels, or indeed of 32*32 pixels, or else indeed of 24*24 pixels.

Such a resolution may be sufficient to make it possible to obtain satisfactory images, while making it possible not to slow down the determination of the calculation of the direction of the user's gaze.

The sensor or sensors may be thermal or based on infrared radiation. The sensor or sensors may be associated with one or more LEDs. The sensor or sensors may comprise a camera, in particular RGB. The camera or cameras may be thermal.

The camera or cameras may be configured so that the eye is situated in the focal plane of the camera.

The sensor or sensors are preferably disposed on the device otherwise than centered with respect to an eye. They are preferably distant from a plane passing through the pupil of the corresponding eye.

The placement of the sensors may make it possible to obtain sufficient contrast between two acquired images so as to view a difference between the two images. The sensors are preferably disposed sufficiently far from the eyelashes. The sensor or sensors may make it possible to capture a zone of the eye of a size of about 5 mm by 5 mm. The sensor or sensors may for example be disposed at a distance from the eye of between 1 cm and 5 cm, for example of the order of 2 cm. The choice of the distance makes it possible to ensure that the sensor is sufficiently close to the eye, and therefore sees only the eye, so as to improve the precision.

The sensor or sensors may be configured to preferably provide weakly localized lighting, stated otherwise rather diffuse lighting. Indeed, it is sought to avoid a reflection of the luminous source from being produced on the eye.

The first sensor and the optional third sensor may have different characteristics of speeds and resolution from the optional second and fourth sensors. In particular, the first sensor and the optional third sensor may operate at a frequency of between 10 Hz and 150 Hz, in particular of about 30 images/sec and have a resolution of at least 100*100 pixels, for example of between 300*300 pixels and 1280*960 pixels.

The optional second sensor and the optional fourth sensor may operate at a frequency of greater than 200 Hz, in particular of between 200 Hz and 2000 Hz, or indeed between 300 Hz and 2000 Hz, in particular equal to 500 Hz and have a resolution of between 32*32 pixels and 140*140 pixels.

In order to minimize the accumulation of errors of the dynamic measurement and of its drift, the frequency ratio between the two sensors is preferably about 10 or more, that is to say the acquisition frequency of the second sensor is preferably equal to more than 10 times that of the first sensor.

Position of the User's Head

It is possible to determine the movement of the device with respect to a base module. The base module may for example be fixed to a screen of a computing system.

The expression "computing system" is understood to mean any computing system comprising a screen for interacting with the user, for example a fixed or portable computer, a tablet, a fixed or mobile telephone, this list not being limiting.

It is for example possible to use optical beacons or luminous sources disposed on the device, in particular fixed to the device, for example on branches of the latter, and a sensor, for example a camera, disposed on the base module.

Here the term "optical beacon" designates a passive element such as an optical reflector or a material reflecting a certain wavelength when it is illuminated by an external source. Such beacons offer an alternative possibility to the presence of active elements such as luminous sources of a certain wavelength belonging to the device.

The wavelength emitted directly by a luminous source of the device or reflected by a beacon may be in the visible, or the near infrared, which is preferable since it is invisible to the human eye. This luminous flux emitted directly by the luminous source of the device or reflected by a beacon may have one or more wavelengths simultaneously or alternately over time, may be polarized linearly, circularly, or in any other way, may be continuous in amplitude or in phase, or amplitude-modulated or phase-modulated.

The movement of the device with respect to the base module is determined for example by triangulation. It is for example possible to use at least three points defined by luminous beacons or sources [see your paragraph further on regarding the possible forms] on the device and a camera on the base module.

The at least three points are not aligned and are disposed in a plane not perpendicular to the optical axis of said camera. The at least three points may be disposed in a plane substantially parallel to the optical axis of said camera. A corresponding algorithm is described in the article "3D Pose from 3 Corresponding Points under Weak-Perspective Projection" by T. D. Alter, Massachusetts Institute of Technology, Artificial Intelligence Laboratory, A. I. Memo No. 1378, July 1992.

The optical beacons or luminous sources may be of various forms.

They may be pointlike, for example of LED type, possibly between 3 and 9 in number, each point then comprising an optical beacon or a luminous source.

They may be of linear, curved, rectilinear, continuous or non-continuous form, for example comprise an optical fiber with lateral lighting.

The optical beacons or luminous sources may form an identifiable and non-ambiguous pattern.

They may exhibit combinations of several forms.

The sources or beacons are for example disposed toward the outside of the head.

The luminous sources used to determine the movement of the device with respect to the base module may be for example infrared LEDs. The camera may be an infrared camera.

A reconstruction is undertaken of the six degrees of freedom of the position of the head with respect to the base module, stated otherwise with respect to the screen to which it may be fixed.

Thus, one measures on the one hand the direction of the gaze, stated otherwise the movement of the eyes with respect to the head, and on the other hand the movement of the head with respect to the screen. Such a method makes it possible to minimize the necessary calibration. The two processings may be performed simultaneously.

In a variant embodiment, it is for example possible to use two gyroscopes and a distance sensor, one disposed on the device and the other disposed on the base module, which may be fixed to a screen.

In a variant embodiment, the screen is not independent of the device but secured to the latter, so that the determination of the direction of the user's gaze with respect to the device suffices to determine the direction of the user's gaze with respect to the screen. In another variant embodiment, the screen is remote from the device.

Observation Point

It is possible to determine the point of observation of the user on a screen on which the base module is fixed, in particular a screen of the computing system mentioned above, on the basis of the meeting point of the two visual axes of the user determined on the basis of the items of information relating to the direction of gaze. The expression "visual axis" is understood to mean the axis between the fovea and the optical center of the user's eye. The fovea is a zone of the retina slightly offset with respect to the center of the retina, and allowing the best color vision. The meeting point of the two visual axes therefore indicates the observation point on the screen. The "optical axis" is the axis between the center of the user's retina and the optical center of the eye. A slight offset of about 5°, and which depends on the user, exists between these two axes. By using a precise measurement of the relative orientation of the head with respect to the screen, and a measurement of the orientation of the two eyes, stated otherwise a binocular measurement, the invention makes it possible to obtain the measurement of the convergent visual axes on the screen. The measurement of the direction of the optical axes does not call upon the reconstruction of the point of corneal reflection (glint) introducing a non-linearity having to be corrected by an unwieldy calibration. Thus, the invention makes it possible to facilitate the determination of the observation point.

Calibration

It is possible to perform a calibration by asking the user to follow a mobile target on the screen, stated otherwise the eye is compelled to perform an ocular tracking. In case of ocular tracking, the eye physiologically optimizes its displacement so as to minimize it, and uses the same zone of the fovea, so that this calibration allows the position of the fovea to be defined better. A variant consists in asking the user to fix one or more points on the screen at precise instants. In the foregoing, the user is forewarned that a calibration is performed.

In the invention, no points of reflections of a luminous source, for example of the sensors, are sought. It is not sought to chart a point of reflection (glint) of a luminous source on the cornea. In the invention neither is it sought to recognize in the captured images the image of a real object reflected on the user's cornea.

Device

The subject of the invention is furthermore, according to another of its aspects, independently or in combination with the foregoing, a device for determining the direction of the gaze of a user, in particular spectacles or helmet, intended to be immobilized on the user's head, so as to control a computing system, comprising:
  at least one first optical sensor configured to acquire an image of all or part of an eye of the user,
  an electronic circuit allowing at least one preprocessing of the data, and
  a wireless emitter.

The wireless transmission of the data makes it necessary to reduce the volume of the data to be transmitted.

The wireless emitter may have receiving functions and be an emitter/receiver. The data transmitted may be analog or digital. These are for example data of audio or video type.

The processor makes it possible to accelerate the final processing of the data by virtue of the preprocessing. The use of an onboard processor makes it possible to perform a preprocessing of the data obtained from the sensors and therefore to decrease the quantity of data to be transmitted to the base module, thereby making it possible to accelerate the method. The processor may comprise at least a part of the previously mentioned algorithms that is necessary for the processing of the data.

The device is preferably positioned on the user's nose and/or ears, in a manner analogous to a pair of spectacles.

The device may comprise a battery affording it enough energy self-sufficiency, for example of at least several hours of operation without recharging, or indeed of at least a day. The use of low-resolution images makes it possible to reduce electrical consumption and thus to increase the energy self-sufficiency of the device.

The user's head may be stationary with respect to the device.

Assembly

The subject of the invention is furthermore, according to another of its aspects, independently or in combination with the foregoing, an assembly comprising:
  a device such as described above, and
  a base module intended to be fixed to a screen of a computing system and connected to the latter.

The device may communicate with the base module through a wireless link.

The base module may be configured to be able to be used immediately upon its connection to the computing system. Stated otherwise, it may be recognized rapidly, easily and automatically by the operating system of the computing system immediately upon connection or immediately upon rebooting after hardware installation ("Plug and Play"). This procedure allows installation while requiring a minimum of intervention on the part of the user and therefore while minimizing manipulation errors and parametrization errors.

The assembly may comprise several devices able to communicate with one and the same base module.

DESCRIPTION OF THE FIGURES

The invention will be better understood on reading the detailed description which will follow, of an exemplary embodiment of the invention, and on examining the appended drawing in which.

Figure 1:
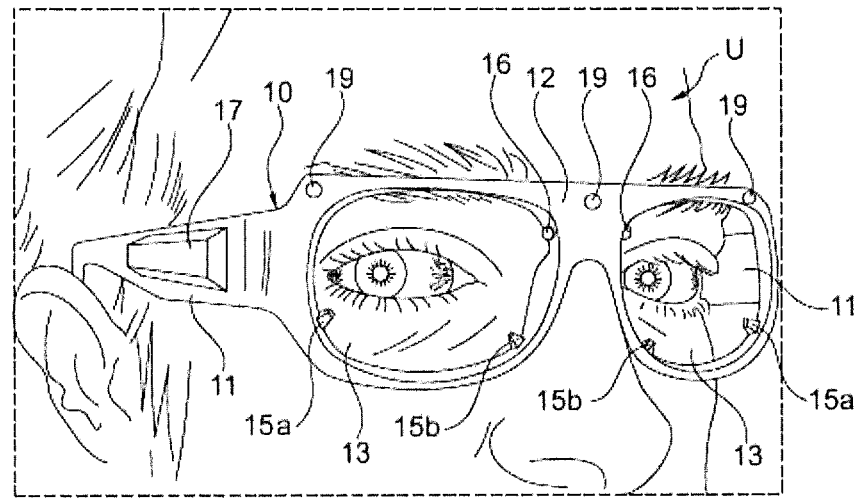
FIG. 1 is a schematic and partial perspective view of a device for determining the direction of gaze in accordance with the invention.

Illustrated in FIG. 1 is a user U wearing a device 10 for determining the direction of gaze, taking the form of spectacles worn by the user, comprising branches 11 resting on the ears and a central part 12 resting on the nose, the lenses 13 of the spectacles being able to comprise an anti-reflection coating.

The device comprises in the example described two infrared LEDs 16 disposed in the central part 12 on either side of the nose and each oriented toward one of the user's eyes, as well as four RGB cameras 15a, 15b that are able to detect infrared radiation. Each of the cameras 15a, 15b is disposed and oriented toward one of the user's eyes, being disposed below the eyes on the perimeter of the lenses 13 of the device and each disposed otherwise than in a vertical plane passing through the center of the user's pupil. For each of the user's eyes, two cameras 15a, 15b are disposed on either side of them, one on the side of the nose and the other on the side of the branch resting on the corresponding ear, being oriented toward the user's corresponding eye so as to acquire images thereof. The cameras 15a are oriented toward the user's pupil, and the cameras 15b toward the user's sclera.

The device 10 also comprises an electronic circuit 17 housed in the example described in one of the branches 11 of the device, this electronic circuit 17 making it possible to process the images acquired by the cameras 15a, 15b, as will be described further on.

The device furthermore comprises a battery, not visible in the figure, disposed for example in the second branch of the device and affording it enough energy self-sufficiency as not to have to be recharged for an acceptable duration, for example of several hours, or indeed of an entire day.

Figure 2:
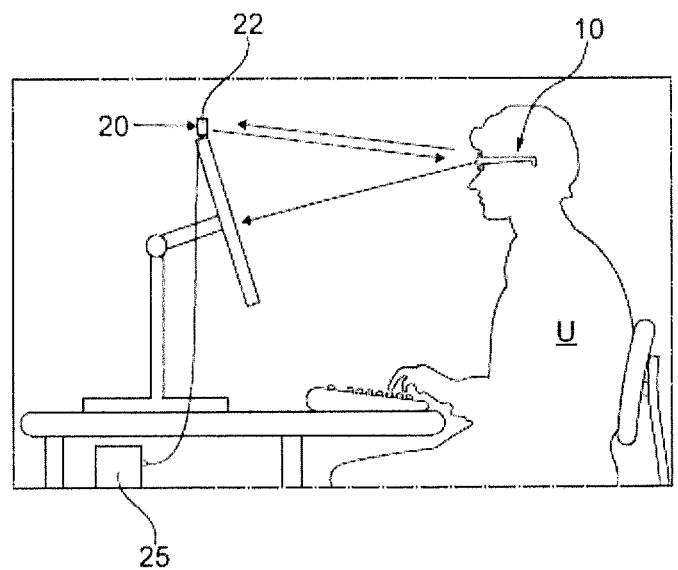
FIG. 2 illustrates in a schematic and partial manner an assembly comprising the device of FIG. 1.

The device furthermore comprises a wireless emitter also housed in one of the branches, transmitting the data to a base module 20 fixed to a screen 25 of a computing system and connected to the latter, as illustrated in FIG. 2.

The device furthermore comprises luminous sources 19 which make it possible, by virtue of a camera 22 disposed on the base module 20, to determine the movement of the device 10 with respect to the base module 20, in such a way as to determine a relative displacement of the eye with respect to the camera and the evolution of the direction of gaze over time.

Said luminous sources 19 are, in the example described, infrared LEDS, for example disposed in a non-aligned manner and in a plane which is not perpendicular to an axis of the camera of the base module, as illustrated. In the example, one of the luminous sources 19 is disposed above the user's nose, while the others are disposed on either side of the eyes in the upper part of the device. The luminous sources 19 are oriented toward the outside, that is to say toward a camera 22 of the base module 20.

In a variant, optical beacons are used in place of the luminous sources 19.

Figure 3:
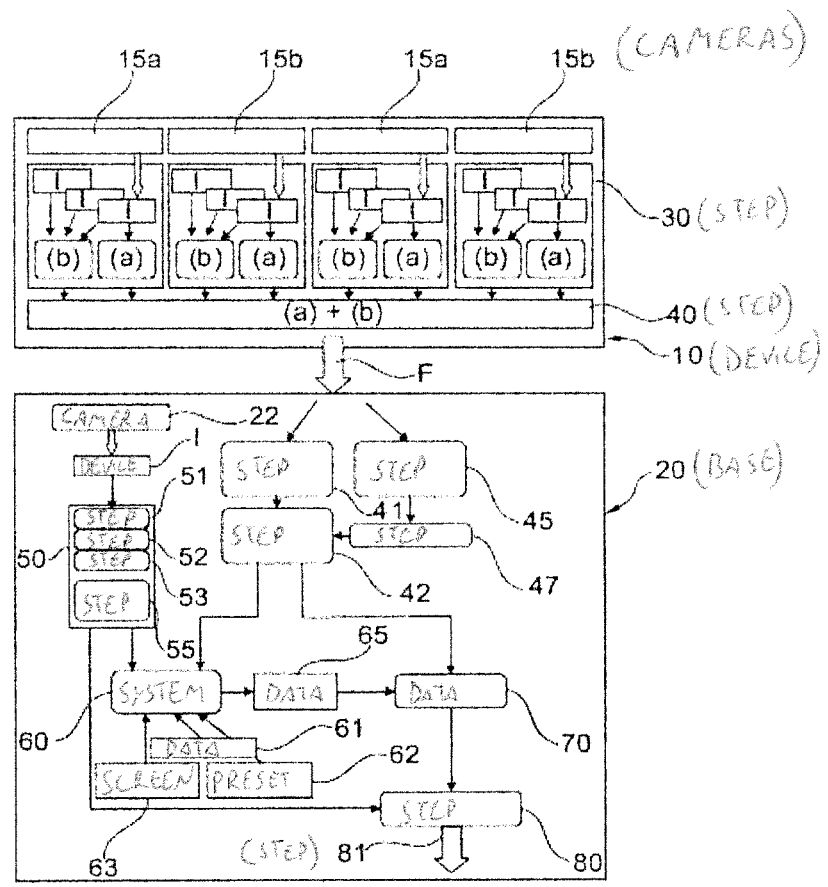
FIG. 3 is a block diagram illustrating the method for determining the direction of gaze in accordance with the invention.

The steps, as illustrated in FIG. 3, of a method in accordance with the invention will now be described in detail.

In a step 30, each of the cameras 15a, 15b captures images I at regular time intervals of the user's corresponding eye or more precisely of the part of the corresponding user's eye.

Figure 4:
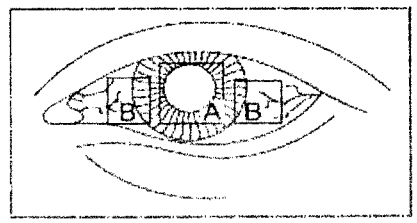
FIG. 4 illustrates the capture of the images on the eye.

In the example described, the cameras 15a capture an image A of a zone of the eye comprising at least partially the pupil while the sensors 15b capture an at least partial image B of the sclera of the eye, as may be seen in FIG. 4. Of course, each of the sensors could capture images at one and the same time of the pupil and of the sclera without thereby departing from the scope of the present invention.

The images I are processed in a step 40 at least partially to perform at least in part two distinct processings (a) and (b), by means of the electronic circuit 17 of the device 10, which makes it possible to perform these two processings at least in part, the processings being thereafter continued in the base module. In the example described, only a part of the two processings may be performed in the onboard processor embedded in the device, the data being thereafter transmitted by a wireless link F to the base module in which the remainder of the processings is performed.

The first processing (a) makes it possible to provide an item of information about the orientation of the eye on the basis of the observation of a zone of the eye whose aspect varies with the rotation of the eye. This processing may be performed for each of the images captured. It comprises the determination in step 41 of the parameters related to the shape of the ellipse corresponding to the pupil. The first processing (a) makes it possible to deduce therefrom the optical axes in the frame of reference of the user's head in step 42.

More precisely, steps 41 and 42 of reconstructing the orientation of the pupil comprise the selecting of the darkest zone of the processed image, the isolating of the pupil in this image, and then the obtaining of the contour of the pupil. From this are deduced the position of the center of the pupil, the major and minor axes of the ellipse and an angle defining the orientation of the ellipse, and finally the normal to the pupil in a three-dimensional space.

Thereafter, a reconstruction of the center of rotation of the pupil is undertaken by determining a sphere on the basis of measurement points and of the previously determined normals. From this are deduced the center of rotation and the radius of this sphere.

Moreover, a second processing (b) of the images is performed which provides an item of information about the kinematics of the eye by comparing at least two successive images in step 45.

For this purpose, a contrasted sub-image in the image I at a given instant is firstly selected. Next, a displacement of this same sub-image is sought by seeking a corresponding sub-image in the following image such that a correlation between the two sub-images is maximal. The approximation of the non-deformation of the sub-image between the two successive images is correct insofar as the frequency of capture of the images is sufficient, being in particular much greater than the speed of the observed movement, that is to say in the example described greater than 500 Hz.

Starting from a primary orientation of the eye, the change of orientation of the eye is calculated on the basis of the set of previously determined infinitesimal displacements. The angular displacement of the eye, that is to say the two angles of rotation (pitch and yaw) around arbitrary perpendicular axes is then reconstructed, from an arbitrary direction.

Moreover, the second processing (b) is used in step 47 to correct the corneal refraction which may produce non-linearities stemming from the refraction of the pupil on the cornea, which make it possible to correct the items of information of the first processing (a) in step 42. The direction of the normal obtained previously makes it possible to determine a direction of the optical axis which may be marred by error due to corneal diffraction, and noise stemming from the reconstruction of the ellipse. The angular displacement makes it possible to obtain the variation of the angular variation of the optical axis on the basis of an arbitrary initial direction. This measurement may also be marred by an error related to the resolution of the correlation measurement. The direction of the optical axis is obtained by weighting these two measurements at each iteration, by taking into account the positioning obtained at the previous step, the three-dimensional reconstruction of the eye, and a parametrization arising from the calibration.

In parallel, a processing 50 is performed to determine the position of the user's head with respect to the base module, that is to say the movement of the device 10 with respect to the base module 20. The camera 22 disposed on the base module 20 captures images I of the user's head, in which images the light arising from at least three points defined by the optical beacons or the luminous sources 19 of the device 10 is visible. These images are processed so as to determine the position of the device with respect to the base module. In a first step 51, the luminous points in the image are selected. In a second step 52, the noise is eliminated so as to ensure that the luminous points viewed in the images do indeed correspond to the luminous beacons or sources 19 intended to determine the movement of the device with respect to the base module. In a third step 53, the position of the luminous points in the image is determined and on the basis of these data, in a step 55, the position of the head with respect to the base module is calculated.

Moreover, in a step 60, the four angles of the fovea with respect to the cameras are determined on the basis of physiological data 61, of preset parameters 62, as well as of previously calibrated coordinates of the screen 63. The preset parameters 62 may be construction parameters of the device and of the base module, for example the position of the cameras or of the lighting.

With calibration data 65, the two visual axes are deduced therefrom in a step 70.

Finally, on the basis of the crossover of the visual axes as well as of the position of the head with respect to the base module, the coordinates of the point of the screen at which the user is gazing are calculated in step 80, and this may be transmitted to the computing system in step 81.

EXAMPLES OF USE OF A DEVICE ACCORDING TO THE INVENTION

Example 1: Evolution in a Given Environment

The device makes it possible to establish a relationship between the direction of the gaze of an operator and a work environment so as to improve the design and the ergonomics of this environment. The environment being able to be for example a piloting cockpit of an aircraft, such as illustrated in FIG. 5, of a car, of a simulator or a multi-screen control environment.

Figure 5:
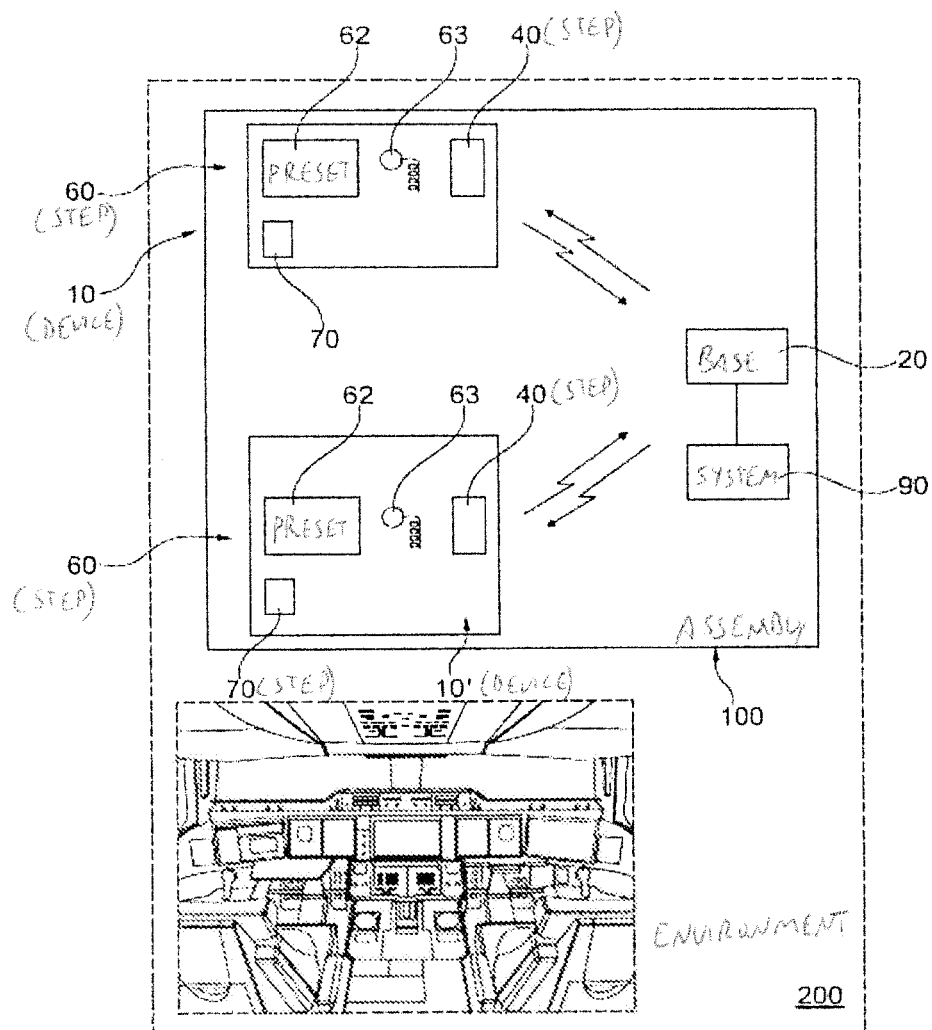
FIG. 5 illustrates in a schematic manner an assembly according to the invention in a given environment.

The assembly 100 of FIG. 5 comprises a device 10 in the form of spectacles, not illustrated, communicating through a wireless link with the base module 20, the latter connected to a computing system 90. The assembly 100 is disposed in an environment 200, here an aircraft piloting cockpit. Thus the base module 20 may be used immediately upon its connection to the computing system. The assembly 100 represented comprises several devices 10 and 10', worn for example by the pilot and the co-pilot. In addition to four image sensors and an electrical circuit, none of which are represented, each device 10, 10' comprises an emitter/receiver 40 for communicating wirelessly with the base 20, an information representation system 60 comprising in the example illustrated a semi-transparent screen 62 partially overlaid on the lenses of the spectacles, and an earpiece 63. The device 1 also comprises a sensor of an item of physiological information 70 so as to evaluate the psychological state of the wearer of the device 10, in particular in a potentially stress generating emergency situation.

Example 2: Training and/or Gaming

In the case of "serious games" or operator training procedures, the device makes it possible to quantify the gaze and the effectiveness of the training and in particular to measure operator compliance with the safety standards in a critical environment.

Example 3: User Interface

In the case of the handicapped, the device according to the invention may in particular act as substitute for the mouse and for the keyboard for upper limb paraplegics.

With the binocular measurement (simultaneous measurement of the direction of both eyes in the same frame of reference), the user's vergence is measured, the latter being a fundamental parameter having applications in the field of ophthalmology or three-dimensional space charting.

The implementations represented and the examples are given merely by way of illustration and are not limiting of the invention.

The invention claimed is:

1. A method for determining the direction of the gaze of a user comprising acquisition of images of the eye, with the aid of at least one optical sensor, the method comprising:
   a) a first processing of acquired images which provides an item of information about the orientation of the eye, on the basis of the observation of a zone of the eye whose aspect varies with the rotation of the eye, and
   b) a second processing of these acquired images independent of the first processing which provides an item of information about the kinematics of the eye by comparing at least two successive images, the second processing comprising determination of an optical flow between two successive images of the eye,
   in which method an item of information relating to the direction of the gaze in relation to the user's head is generated on the basis at least of the items of information delivered by the first and second processings,
   in which method use is made of a device worn by the user comprising:

at least one first optical sensor being a camera configured to acquire an image of all or part of an eye of the user, an electrical circuit allowing at least one preprocessing of the acquired images, so as to determine a relative displacement of the eye with respect to the camera and the evolution of the direction of gaze over time, in which the device comprises at least one second optical sensor configured to acquire an image of all or part of the user's eye, in which the first and second optical sensors allow the acquisition of images of one and the same eye of the user.

2. The method as claimed in claim 1, in which the first processing comprises the determination of the parameters related to the shape of the ellipse corresponding to pupil so as to determine the position of a point of the eye.

3. The method as claimed in claim 1, the image acquisition scheme used being non-intrusive of the eye and the images acquired representing external kinematic and/or anatomical data of the eye.

4. The method as claimed in claim 1, the item of information delivered by the first processing making it possible to correct within the precision of the measurement the drifts related to the second processing.

5. The method according to claim 1, in which the first and the second optical sensor are each directed toward a different part of one and the same eye of the user.

6. The method as claimed in claim 1, furthermore comprising at least one other optical sensor worn by the user and configured to acquire an image of all or part of the user's second eye.

7. The method as claimed in claim 6, in which the movement of the device is determined with respect to a base module.

8. The method as claimed in claim 7, in which the point of observation of the user is determined on a screen to which the base module is fixed, on the basis of the meeting point of two visual axes of the user determined on the basis of the items of information relating to the direction of the gaze.

9. The method as claimed in claim 1, in which a calibration is performed by asking the user to follow a mobile target on a screen.

10. A method for determining the direction of the gaze of a user comprising:

acquisition of images of an eye with a device worn by the user comprising:

at least one first optical sensor being a camera configured to acquire an image of all or part of the eye of the user, an electrical circuit allowing at least one preprocessing of the acquired images, so as to determine a relative displacement of the eye with respect to the camera and the evolution of the direction of gaze over time, at least one second optical sensor configured to acquire an image of all or part of the user's eye, the method comprising:

a) a first processing of acquired images which provides an item of information about the orientation of the eye, on the basis of the observation of a zone of the eye whose aspect varies with the rotation of the eye, and b) a second processing of acquired images which provides an item of information about the kinematics of the eye by comparing at least two successive images, in which method an item of information relating to the direction of the gaze in relation to the user's head is generated on the basis at least of the items of information delivered by the first and second processings and in which the first and second optical sensors allow the acquisition of images of one and the same eye of the user.

* * * * *